United States Patent Office 2,914,451
Patented Nov. 24, 1959

2,914,451

PREPARATION OF ORGANO MERCURIC COMPOUNDS

Andrew A. Baldoni, Lake Geneva, Wis., and James J. Miyashiro, Woodstock, Ill., assignors, by mesne assignments, to Morton Chemical Company, Chicago, Ill., a corporation of Delaware No Drawing. Application September 9, 1955
Serial No. 533,525

13 Claims. (Cl. 204—158)

This invention relates to the preparation of organo mercuric compounds. More particularly, this invention relates to the preparation of alkyl mercuric compounds. In one specific aspect thereof, this invention relates to the preparation of methyl mercuric iodide. In yet another specific aspect thereof, this invention relates to the preparation of methyl mercuric hydroxide.

Alkyl mercuric hydroxides are highly useful compounds, both as such and as intermediates for the preparation of other organo mercuric compounds. Methods for the preparation of alkyl mercuric hydroxides are set forth in standard organic chemistry textbooks. For example, Richter, Organic Chemistry (third English edition, volume one, page 223 (1934)), states, that alkyl mercury iodides may be prepared by the action of mercury on alkyl iodides in the presence of sunlight and that alkyl mercuric iodides formed in this way may be converted to the hydroxides by treatment with moist silver oxide. While this process, as broadly outlined in Richter, is suitable for the preparation of a single small batch of an alkyl mercuric hydroxide on the laboratory scale, it is quite unfeasible, both economically and chemically, for the continuing preparation, batch followed by batch, of alkyl mercuric hydroxides on the commercial scale.

One object of this invention is to provide an improved process for the preparation of organo mercuric compounds.

Another object of this invention is to provide an improved process for the preparation of alkyl mercuric compounds.

An additional object of this invention is to provide an improved process for the preparation of alkyl mercuric hydroxides.

A further object of this invention is to provide an improved process for the preparation of alkyl mercuric iodides.

Yet another object of this invention is to provide an improved process for the preparation of methyl mercuric iodide.

A still further object of this invention is to provide an improved process for the preparation of methyl mercuric hydroxide.

Additional objects of this invention will become manifest as the description thereof proceeds.

As the result of much experimentation a process for the preparation of alkyl mercuric hydroxides has been evolved which is feasible, both economically and chemically, for the continuing preparation of alkyl mercuric hydroxides on the commercial scale. There follows a complete description of a specific embodiment of this process which, for convenience in exposition, is described in connection with the application of the process to the preparation of methyl mercuric hydroxide. Following this complete description of the specific embodiment of the improved process will be found a discussion of various process variables, the application of the process to the production of other organo mercuric compounds, and the like.

EXAMPLE 1

*a. Preparation of methyl mercuric iodide.*—For the initial preparation of a batch of methyl mercuric iodide a closed reactor provided with a reflux condenser, a source of illumination, efficient agitation means and means for the application of heat is charged with 100 parts mercury (0.498 atoms), 8 parts iodine (0.0315 moles) and 375 parts (2.64 moles) methyl iodide.

This reaction mixture is agitated vigorously and is illuminated by light from ordinary frosted electric light bulbs placed in close proximity to the reaction mixture. If the light bulbs do not supply sufficient heat to cause refluxing of the reaction mixture (reflux temperature, 42.5–45° C.), the necessary additional quantity of heat to bring about refluxing of the reaction mixture is supplied from any convenient source.

The reaction between the iodine present and the mercury proceeds rapidly and is complete in a few minutes at which time the reaction mixture has an olive color. The catalyzed photochemical reaction involving methyl iodide and resulting in the formation of methyl mercuric iodide proceeds more slowly but is complete in about two hours at which time all mercury has disappeared and the reaction mixture is a straw color.

It is evident from the above discussion that the mercury reacts in two ways (1) with iodine to form mercurous iodide which in turn reacts with methyl iodide to give methyl mercuric iodide and mercuric iodide, and (2) with this mercuric iodide to regenerate the mercurous iodide. There are then 0.467 atoms mercury available for reaction with methyl iodide and accordingly 566% theory methyl iodide was charged to the reactor. The excess methyl iodide serves as the reaction medium and at the conclusion of the reaction holds 0.467 moles methyl mercuric iodide and 0.0315 moles mercuric iodide in solution.

*b. Recovery of mercuric iodide.*—For the laboratory scale preparation of a small single batch of methyl mercuric hydroxide the presence of mercuric iodide in the above reaction mixture causes no particular difficulty. However, in commercial operations, where large batches of methyl mercuric hydroxide are prepared on a continuing basis, it is necessary that many byproducts of the reaction be recovered, reconverted to reactants and recycled in order to make the process economically feasible. Also, in such commercial operations, it is necessary that the recovery of byproducts be as nearly quantitative as possible. Otherwise, the byproducts will gradually accumulate in the system and will interfere with subsequent reaction and/or byproduct recovery steps making the process chemically unfeasible.

As the result of an intensive investigation of the process, a simple and expeditious method of recovering mercuric iodide from the above reaction mixture has been evolved.

At the conclusion of the reaction the source of illumination is shut off and 93.5 parts (0.466 atoms) mercury are added to the reaction mixture and stirring at reflux temperature is continued for about one hour. Under these conditions the mercuric iodide is reduced to mercurous iodide which is insoluble in methyl iodide. The resulting suspension is filtered and the mercurous iodide-mercury cake is washed with 228 parts methyl iodide, the washed cake being returned to the reactor.

It will be noted that the washed cake contains 0.435 atoms elemental mercury and 0.063 atoms mercury in the form of mercurous iodide or a total of 0.498 atoms mercury. In addition, this cake contains 0.0315 moles iodine as mercurous iodide. Now on adding 375 parts of methyl iodide to the washed cake in the reactor it is seen that the reactor has the same charge of mercury, iodine and methyl iodide as was used in the initial run. (The fact that the washed cake is wet with methyl iodide makes no difference as a large excess of methyl iodide is employed in any event to serve as a reaction medium. If desired, an exact methyl iodide balance may be maintained by reducing the quantity of methyl iodide added to the methyl iodide saturated mercurous iodide-mercury cake by an amount sufficient to compensate for the methyl iodide content of the cake.) The preparation of the second batch then proceeds as previously described and the same procedure is followed in succeeding runs.

It is evident that by the above process not only is contaminating mercuric iodide removed from the reaction mixture but it is recovered in a form ideal for direct and immediate recycling to the reaction zone for reuse.

It will now be obvious that, if desired, the above beneficial results may also be accomplished in a somewhat different fashion. If the illumination of the reacting mixture is stopped before all mercury has disappeared this unreacted mercury will serve to reduce mercuric iodide present to mercurous iodide. The resulting suspension may then be filtered and worked up as previously described. However, it is usually more convenient to follow the procedure whereby the mercury reacts completely following which additional mercury is added and reduction of mercuric iodide occurs in the absence of radiation. By operating in this manner it is not necessary to run control tests on the reaction mixture during the course of the reaction to assure that the illumination is shut off while there is still sufficient mercury available to reduce the mercuric iodide. In the preferred process, the reaction is run to completion following which the mercury required to reduce mercuric iodide and to react with methyl iodide in the subsequent run is added to the non-illuminated reaction mixture as previously described.

c. *Recovery of methyl iodide.*—Two hundred parts water are added to the filtrate and washings from the mercurous iodide-mercury cake, the resulting mixture is stirred and then distilled to recover methyl iodide. Of the excess methyl iodide charged to the reactor and the methyl iodide coming through as wash from the mercurous iodide-mercury cake, 96% was recovered in this distillation. The recovered methyl iodide is recycled to the reactor.

It is not necessary to dry the methyl iodide recovered by distillation from the aqueous still charge prior to recycling to the reactor. The reaction is quite insensitive to water. For example, it has been found that the presence of as much as 40 parts water (per 100 parts mercury used) had no adverse effect on reaction.

d. *Preparation of methyl mercuric hydroxide.*—The aqueous suspension of methyl mercuric iodide remaining after distillation of methyl iodide is treated with 75 parts silver oxide in the form of moist hydrous silver oxide. The resulting slurry is stirred for about three hours at 50–60° C. and then filtered, the filter cake being washed with about 250 parts water. From 550 to 600 parts filtrate and washings are obtained containing 109 parts (quantitative yield) methyl mercuric hydroxide.

e. *Recovery of silver.*—The washed silver iodide cake is stirred with 326 parts water for about 30 minutes following which 32.6 parts zinc dust are added over a period of about 15 minutes. The slurry is then stirred for about 1.5 hours. A small sample of the supernatant liquid is then made strongly acid by addition of concentrated hydrochloric acid. If the solution is clear, reaction is complete. If a precipitate forms, additional zinc dust is added to the main body of the reaction mixture and stirring is continued until tests show reaction is complete. After reaction is complete the slurry is brought to a pH of below 1.0 by addition of concentrated hydrochloric acid thereto (about 71 parts required), is stirred for two hours and then centrifuged, the resulting cake of "molecular" silver being thoroughly washed with hot water until free from halides.

The silver is dissolved in 116 parts nitric acid (specific gravity 1.42) diluted with 109 parts water. The reaction mixture is heated with steam for about 30 minutes following which it is made alkaline by the addition of 35% sodium hydroxide solution thereto. The precipitated hydrous silver oxide is separated by centrifuging and is washed until free from alkali. Recovery: Almost quantitative.

One of the many benefits resulting from the separation of mercuric iodide from the reaction mixture by addition of mercury to form insoluble mercurous iodide and filtering is now evident from a consideration of the silver recovery process just described. If this mercuric iodide is not removed from the reaction mixture it appears, along with the methyl mercuric iodide formed, in the aqueous still bottoms from the methyl iodide recovery step. On treating the resulting mixture with hydrous silver oxide, enough of this reagent must be supplied to react with not only the methyl mercuric iodide but also the mercuric iodide present. Furthermore, and much more serious, the resulting reaction products from mercuric iodide are insoluble and pass along to the silver recovery process. As a result, hydrous silver oxide resulting from the silver recovery process is contaminated with this mercury (also in the form of a hydrous oxide) and the amount of contamination increases as the recycling of the silver continues as successive batches of methyl mercuric iodide are worked up. Accordingly, when the process of the present invention is not followed, it is necessary at frequent intervals to stop operations, take the contaminated silver and work it up to separate the mercury therefrom. The separation of mercury from silver requires either that the mixture of these elements be roasted to volatilize the mercury present or that the mercury-silver mixture be dissolved in nitric acid and the silver separated by precipitation as the chloride which is removed by filtration and reduced to the metal with zinc dust. The mercury in the filtrate is recovered by reducing to the element using zinc dust or formaldehyde or some other suitable reducing agent. It is evident that both these separation procedures are tedious and expensive.

f. *Recovery of iodine.*—The solution containing zinc iodide, obtained as the filtrate from centrifuging the slurry resulting from the "zincing" of silver iodide, is adjusted to a pH of about 5 by addition of sodium hydroxide solution and then is passed to an agitated still. The solution is agitated and heated to about 50° C. at which time 63 parts dimethyl sulfate are added slowly to the still contents. After addition of dimethyl sulfate is complete the still contents are gradually heated to 70° C. About 60 parts methyl iodide are taken overhead, representing an iodine recovery of some 85%.

The remarks to be found under "Recovery of methyl iodide" to the effect that it is not necessary to dry recovered methyl iodide prior to reuse in the process of this invention also apply to the methyl iodide formed as described immediately above.

Having now presented a complete description of a specific embodiment of the invention as applied to the preparation of methyl mercuric hydroxide, attention will now be directed to a consideration of a number of process variables.

I. Effect of light

All runs to be described in this section were laboratory scale experiments in which 100 g. metallic mercury (0.498 g. atoms), 375 g. methyl iodide (166 ml., 2.64 g. moles) and 1 g. iodine (0.00394 g. moles) were used. Deducting the amount of mercury reacting with the iodine to form mercuric iodine, the amount of methyl iodide represents 534% theory based on available mercury. As mentioned previously, excess methyl iodide serves as the reaction medium. All experiments to be described were conducted at reflux temperature of the reaction mixture (42.5–45° C.).

*Ia.* In the absence of light and with efficient agitation, no methyl mercuric iodide formed. All of the iodine present reacted however.

*Ib.* In diffused daylight (at a laboratory bench) and without agitation (other than that provided by the refluxing of the reaction mixture) a 50% conversion to methyl mercuric iodide was obtained in 20 hours.

*Ic.* In diffused daylight (at a laboratory bench) and with efficient mechanical agitation a quantitative yield of methyl mercuric iodide was obtained after 20 hours.

*Id.* With efficient mechanical agitation a quantitative yield of methyl mercuric iodide was obtained in 5–6 hours with each of the following light sources. The light sources were placed sufficiently close to the reaction flask as to result in the refluxing of the contents thereof.

(1) 125 watt Hanovia quartz mercury vapor light, the radiation from which is rich in the 2536.519 A. mercury line.

(2) The above light source with a filter transmitting principally radiation around 3660 A.

(3) A 100 watt (about 150 candlepower) frosted electric light bulb.

(4) A 60 watt (about 90 candlepower) frosted electric light bulb.

*Ie.* With efficient mechanical agitation and a 45 candlepower frosted electric light bulb positioned as discussed under *Id,* formation of methyl mercuric iodide was complete in 7.5–9.0 hours.

*If.* A fairly rapid reaction rate is obtained when the reaction mixture is illuminated by the radiation from an infra red lamp which exhibits a maximum in the wave length versus energy curve at about 8000 A.

The reaction is, as the above data show, photochemical but radiation of long wave length (visible and near infra red light) is effective. Also, light of comparatively mild intensity results in quantitative reaction in a comparatively short time although if the intensity is too low the required reaction time increases.

The discovery that radiation of low intensity and free from ultra violet is highly effective in promoting the reaction represents an important advance. Alkyl iodides decompose photochemically with the production of iodine although the quantum yield is quite low—about 0.02% in the case of methyl iodide. However, this photochemical decomposition is greatly accelerated by the presence of metallic mercury. Thus, in a supplementary experiment in which the reaction was conducted in a Vycor glass apparatus with light from a 125 watt Hanovia lamp, after irradiation for ten hours methyl iodide decomposition amounted to 3% in the presence of metallic mercury. On the plant scale (150 pounds mercury per batch) this is equivalent to the production of 4.25 pounds iodine by decomposition of ethyl iodide, obviously an expensive method of obtaining iodine.

II. Effect of catalyst concentration

Although Richter does not mention the fact, the photochemical reaction between an alkyl iodide and mercury requires the presence of iodine as a catalyst. As is well known, alkyl iodides usually contain traces of free iodine resulting from prior slow decomposition of the alkyl iodide. In any event, and as has been previously mentioned, exposure of an alkyl iodide to sunlight during the course of the reaction described by Richter will result in some decomposition with the production of iodine, this photochemical decomposition being greatly accelerated by the presence of metallic mercury in the reaction mixture. Accordingly, the essential catalyst or, more properly, catalyst precursor, is furnished automatically in the process described by Richter although not in optimum concentration and obviously not in the most economical fashion.

It has been found that the rate of reaction increases as the quantity of iodine (catalyst precursor) added to the reaction mixture increases. A series of five laboratory scale experiments was run in which the amount of mercury and of methyl iodide were kept constant at 100 g. and 375 g. respectively. The iodine used in the five experiments was, respectively, 1, 2, 4, 8 and 16 g. In all runs the reaction mixture was efficiently agitated mechanically and was illuminated by a frosted electric light bulb which was located close to the reaction vessel so that the heat from the bulb was sufficient to keep the reaction mixture refluxing. The relative times required for complete reaction to methyl mercuric iodide varied with the amount of iodine added as shown in the following tabulation.

| Iodine, grams: | Relative time for complete reaction |
|---|---|
| 16 | 0.75 |
| 8 | 1.00 |
| 4 | 1.25 |
| 2 | 1.50 |
| 1 | 1.75 |

Taking 8 g. of iodine as a basis, doubling or halving the amount of iodine used results respectively in a 25% decrease or increase in the time required for complete reaction. However, the change in reaction time with variations in the amount of iodine used is not as great as the bare figures of the above tabulation would indicate. Sixteen grams iodine are equivalent to 12.65 g. mercury as mercuric iodide while 1 g. iodine is equivalent to only 0.79 g. mercury. Accordingly, with 1 g. iodine, "complete reaction" requires reaction of some 99.2 g. mercury while with 16 g. iodine only 87.35 g. mercury reacts so a somewhat shorter reaction time is to be expected.

All points of view considered, it was concluded that the use of around 8 g. iodine was best.

III. Effect of agitation

As has been previously indicated in considering the effect of light, agitation plays an important role in bringing the reaction rapidly to completion. By efficient agitation the time for complete reaction may be reduced by as much as 75% over that required in the absence of agitation. In one run in which the reaction mixture was agitated by a 750 r.p.m. stirrer the time for complete reaction was 8.25 hours. In a parallel experiment in which a 1500 r.p.m. stirrer was employed the time for complete reaction was only 5.5 hours.

EXAMPLE 2

Alkyl mercuric iodides prepared in accordance with this invention may be isolated and used as such or may be directly converted into other derivatives. For example, 100 parts mercury, 3 parts mercurous iodide and 375 parts methyl iodide were allowed to interact as previously described. After reaction was complete, mercury was added to reduce the mercuric iodide, the resulting slurry was filtered and the filtrate was treated with water and distilled to remove methyl iodide, all as previously described. The aqueous suspension of methyl mercuric iodide was treated with a solution prepared by dissolving 75 parts mercury in 106.5 parts nitric acid (specific gravity 1.42) diluted with 50 parts water. The mixture was stirred for one hour at 35–40° C. and then filtered, the filter cake being washed with 300 parts water. The filtrate and washings contained methyl mercuric nitrate in quantitative yield.

EXAMPLE 3

A portion of the methyl mercuric nitrate solution of Example 2 was treated with an excess of sodium chloride. White methyl mercuric chloride precipitated in quantitative yield.

EXAMPLE 4

An aqueous suspension of methyl mercuric iodide, prepared as previously described, was treated with the stoichiometric amount of mercuric acetate. The mercuric iodide resulting was removed by filtration, the filtrate containing methyl mercuric acetate in quantitative yield.

EXAMPLE 5

While the present invention has been described largely in connection with the preparation of methyl mercuric compounds it is by no means limited thereto. To demonstrate the wide applicability of the invention, the small scale laboratory preparation of n-propyl mercuric iodide is described.

Thirty grams mercury, 0.5 g. iodine and 174 g. n-propyl iodide were placed in a Pyrex flask provided with a reflux condenser and an efficient mechanical agitator. A 75 watt frosted electric light bulb was placed close to the flask and the agitator was started. Due to the relatively high boiling point of n-propyl iodide (102.5° C.) the heat from the bulb was not quite sufficient to give good refluxing so additional heat was applied to the flask to accomplish this.

The reaction was run for five hours at reflux temperature following which the contents of the flask were worked up as previously described in connection with the preparation of methyl mercuric iodide. At the conclusion of the reaction the light was extinguished and 30 g. mercury added. Agitation at reflux temperature continued for one hour following which the slurry was filtered and the filter cake washed with n-propyl iodide. The filtrate and washings were combined and water was added thereto. The n-propyl iodide was removed by distillation at reduced pressure. An aqueous suspension containing 30 g. n-propyl mercuric iodide, M.P. 107–108° C. was obtained.

EXAMPLE 6

Thirty grams mercury, 0.5 g. iodine and 274 g. methylene iodide were placed in a Pyrex flask provided with an efficient mechanical agitator. A 75 watt frosted electric light bulb was placed close to the flask and the agitator started. Due to the high boiling point of methylene iodide (180° C.) and the fact that this compound tends to decompose at its boiling point, no attempt was made to secure refluxing by application of heat in addition to that furnished by the bulb, the reaction mixture being heated only by the bulb. Reaction was complete in six hours at which time the bulb was shut off, 30 g. mercury were added and agitation was continued for one hour in the dark. The reaction mixture was then filtered, water was added to the filtrate and excess methylene iodide was recovered as described in Example 5 (vacuum distillation). An aqueous suspension containing iodomethyl mercuric iodide was thereby obtained. Concentrated solutions of this compound in methylene iodide have an extremely high density.

The process of this invention is generally not influenced by the purity of the reactants used. As mentioned previously, the deliberate addition of comparatively enormous quantities of water to the reaction mixture had no effect on the reaction. Likewise, it has been found that the purity of the mercury and iodine employed is of relatively small import—ordinary commercial grades of these elements work as well as carefully purified samples thereof. It has been found however that the presence of sulfides in the methyl iodide employed resulted in a considerable extension of the time required for complete reaction. (Methyl iodide is frequently contaminated with traces of sulfides, a byproduct of the synthetic method used in its preparation.) The contaminating sulfides may be removed readily by treating the methyl iodide with 1% Nuchar (an active carbon) and 1% calcium chloride.

Be it remembered, that while this invention has been described in connection with specific details and specific examples thereof, these are illustrative only and are not to be considered limitations on the spirit or scope of said invention except in so far as these may be incorporated in the appended claims.

We claim:

1. A process for the preparation of lower alkyl mercuric iodides including exposing to radiation of a wave length in the approximate range 2536 A. to 8000 A. an agitated mixture comprising mercury, a stoichiometric excess, based on said mercury, of a lower alkyl iodide and a catalytic amount of at least one substance selected from the group consisting of iodine, mercurous iodide and mercuric iodide, continuing the reaction until the mercury has at least substantially disappeared with the formation of a solution in said excess of the lower alkyl iodide of (a) mercuric iodide in an amount stoichiometrically equivalent to the iodine equivalent of the catalyst employed and of (b) lower alkyl mercuric iodide derived from the lower alkyl iodide charged, removing the source of radiation, adding to said solution at least one gram atom of mercury per gram mole iodine equivalent of the catalyst employed, continuing agitation until reduction of the said mercuric iodide to mercurous iodide is at least substantially complete and filtering the resulting suspension to produce a filtrate comprising a solution of the lower alkyl mercuric iodide in the excess of the lower alkyl iodide and a filter cake comprising mercurous iodide.

2. The process of claim 1, further characterized by the fact that the filter cake obtained in the filtering step set forth therein is employed to furnish the mercurous iodide requirements of a succeeding preparation of the lower alkyl mercuric iodide.

3. The process of claim 1, characterized by the fact that the lower alkyl iodide is ethyl iodide.

4. The process of claim 1, characterized by the fact that the lower alkyl iodide is n-propyl iodide.

5. The process of claim 1, characterized by the fact that the lower alkyl iodide is i-propyl iodide.

6. The process of claim 1, characterized by the fact that the lower alkyl iodide is methylene iodide.

7. A process for the preparation of lower alkyl mercuric iodides including irradiating with visible light an agitated mixture comprising mercury, a stoichiometric excess, based on said mercury, of a lower alkyl iodide and a catalytic amount of at least one substance selected from the group consisting of iodine, mercurous iodide and mercuric iodide, continuing the reaction until the mercury has at least substantially disappeared with the formation of a solution in said excess of the lower alkyl iodide of (a) mercuric iodide in an amount stoichiometrically equivalent to the iodine equivalent of the catalyst employed and of (b) lower alkyl mercuric iodide derived from the lower alkyl iodide charged, removing the source of radiation, adding to said solution at least one gram atom of mercury per gram mole iodine equivalent of the catalyst employed, continuing agitation until reduction of the said mercuric iodide to mercurous iodide is at least substantially complete and filtering the resulting suspension to produce a filtrate comprising a solution of the lower alkyl mercuric iodide in the excess of the lower alkyl iodide and a filter cake comprising said mercurous iodide.

8. The process of claim 7, further characterized by the fact that the filter cake obtained in the filtering step set forth therein is employed to furnish the mercurous iodide requirements of a succeeding preparation of the lower alkyl mercuric iodide.

9. A process for the preparation of methyl mercuric iodide including exposing to radiation of a wave length in the approximate range 2536 A. to 8000 A. an agitated mixture comprising mercury, a stoichiometric excess, based on said mercury, of methyl iodide and a catalytic amount of at least one substance selected from the group consisting of iodine, mercurous iodide and mercuric iodide, continuing the reaction until the mercury has at least substantially disappeared with the formation of a solution in said excess of methyl iodide of (a) mercuric iodide in an amount stoichiometrically equivalent to the iodine equivalent of the catalyst employed and of (*b*) methyl mercuric iodide derived from the methyl iodide charged, removing the source of radiation, adding to said solution at least one gram atom of mercury per gram mole iodine equivalent of the catalyst employed, continuing agitation until reduction of the said mercuric iodide to mercurous iodide is at least substantially complete and filtering the resulting suspension to produce a filtrate comprising a solution of methyl mercuric iodide in the excess of methyl iodide and a filter cake comprising said mercurous iodide.

10. A process for the preparation of methyl mercuric iodide including irradiating with visible light an agitated mixture comprising mercury, a stoichiometric excess, based on said mercury, of methyl iodide and a catalytic amount of at least one substance selected from the group consisting of iodine, mercurous iodide and mercuric iodide, continuing the reaction until the mercury has at least substantially disappeared with the formation of a solution in said excess of methyl iodide of (*a*) mercuric iodide in an amount stoichiometrically equivalent to the iodine equivalent of the catalyst employed and of (*b*) methyl mercuric iodide derived from the methyl iodide charged, removing the source of radiation, adding to said solution at least one gram atom of mercury per gram mole iodine equivalent of the catalyst employed, continuing agitation until reduction of the said mercuric iodide to mercuous iodide is at least substantially complete and filtering the resulting suspension to produce a filtrate comprising a solution of methyl mercuric iodide in the excess of methyl iodide and a filter cake comprising said mercurous iodide.

11. A process for the preparation of lower alkyl mercuric iodides including exposing to radiation of a wave length in the approximate range 2536 A. to 8000 A. an agitated mixture comprising mercury, a stoichiometric excess, based on said mercury, of a lower alkyl iodide and a catalytic amount of at least one substance selected from the group consisting of iodine, mercurous iodide and mercuric iodide, continuing the reaction to a point where at least one gram atom elemental mercury per gram mole iodine equivalent of the catalyst employed remains suspended in the reaction product comprising a solution in said excess of the lower alkyl iodide of (*a*) mercuric iodide in an amount stoichiometrically equivalent to the iodine equivalent of the catalyst employed and of (*b*) lower alkyl mercuric iodide derived from the lower alkyl iodide charged, removing the source of radiation, continuing agitation until reduction of the said mercuric iodide to mercurous iodide is at least substantially complete and filtering the resulting suspension to produce a filtrate comprising a solution of the lower alkyl mercuric iodide in the excess of the lower alkyl iodide and a filter cake comprising said mercurous iodide.

12. The process of claim 11, further characterized by the fact that the filter cake obtained in the filtering step set forth therein is employed to furnish the mercurous iodide requirements of a succeeding preparation of the lower alkyl mercuric iodide.

13. A process for the preparation of methyl mercuric iodide including irradiating with visible light an agitated mixture comprising one atom equivalent of mercury, a stoichiometric excess, based on said mercury, of methyl iodide and, as catalyst, from about 0.004 to about 0.064 mole equivalents of at least one substance selected from the group consisting of iodine, mercurous iodide and mercuric iodide, continuing the reaction until the mercury has at least substantially disappeared with the formation of a solution in said excess of methyl iodide of (*a*) mercuric iodide in an amount stoichiometrically equivalent to the iodine equivalent of the catalyst employed and of (*b*) methyl mercuric iodide derived from the methyl iodide charged, removing the source of radiation, adding to said solution about $(1-x+y)$ atom equivalents of mercury where $x$ is the mole equivalents of iodine and $y$ is the mole equivalents mercurous iodide included in the original reaction mixture, continuing agitation until reduction of the said mercuric iodide to mercurous iodide is at least substantially complete, filtering the resulting suspension to produce a filtrate comprising a solution of methyl mercuric iodide in the excess of methyl iodide and a filter cake comprising said mercurous iodide, returning the filter cake to a reactor, adding water to the filtrate and distilling to remove excess methyl iodide and produce an aqueous suspension containing methyl mercuric iodide, returning recovered methyl iodide to said reactor, adding the requisite quantity of makeup methyl iodide to said reactor and initiating a succeeding preparation of methyl mercuric iodide.

References Cited in the file of this patent

Richter: Organic Chemistry (third English ed.), vol. 1 (1934), page 223.

Science, vol. 56 (1922), p. 492.

Mellor: Comprehensive Treatise on Inorganic and Theoretical Chem., vol. 4, pages 897 and 899.

Krause and Groose: Die Chemie der Metal-organischen Verbindungen, Edward Brothers, Inc., Ann Arbor, Mich. (1943), pp. 128–129.